July 29, 1969     A. L. COULTER     3,457,949
CHECK VALVE
Filed Aug. 24, 1966
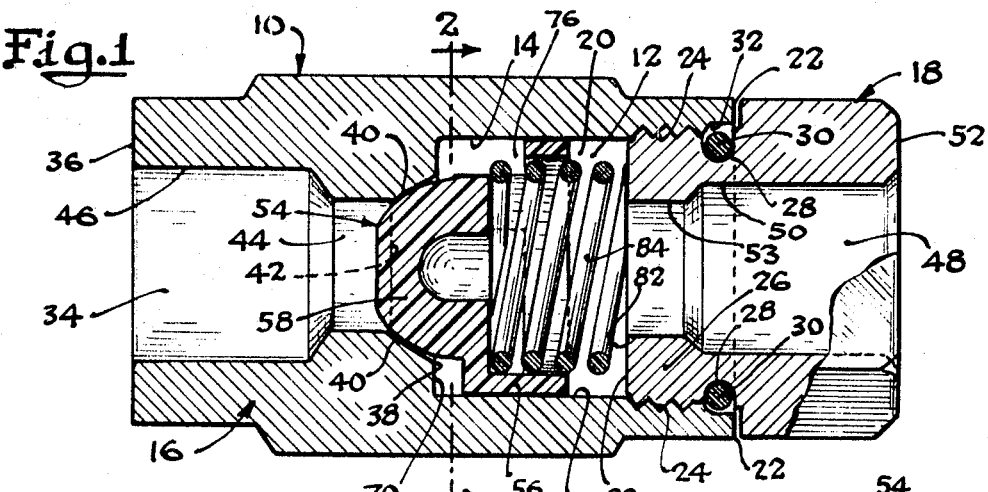
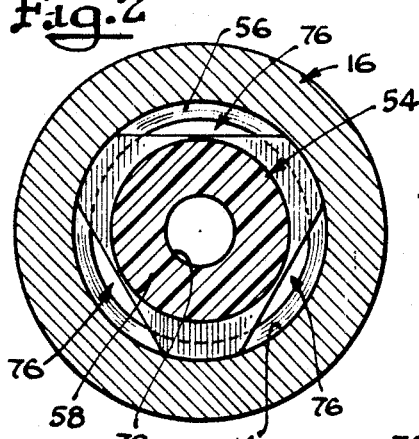
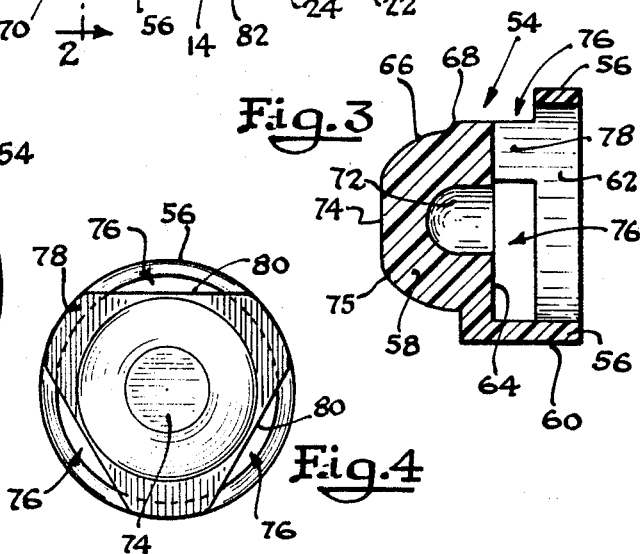
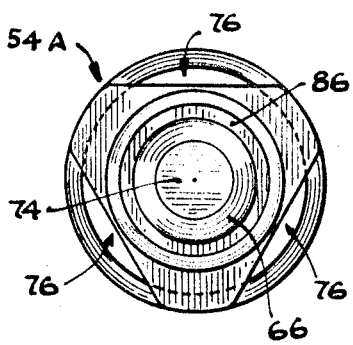
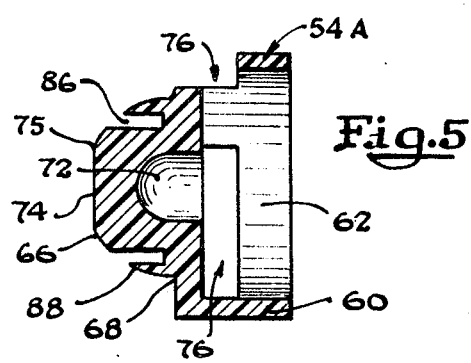
Inventor
ALBERT L. COULTER
By Burmeister & Kulie
Attorneys United States Patent Office 3,457,949
Patented July 29, 1969

3,457,949
CHECK VALVE
Albert L. Coulter, Commercial Road, P.O. Box 436,
Crystal Lake, Ill. 60014
Filed Aug. 24, 1966, Ser. No. 574,760
Int. Cl. F16k 15/02, 21/04
U.S. Cl. 137—543.21                    8 Claims

ABSTRACT OF THE DISCLOSURE

A check valve designed to provide the functional attributes of a ball check valve in conjunction with improved flow characteristics with a minimized flow resistance through a valve body of reduced transverse size. A flow control slide slidably disposed in a valve chamber defined within a valve body has a flow control head formed as a segment of a sphere confronting a valve seat shaped generally in the form of a truncated cone. A spring urges the slide toward the seat to engage with the seat an annular sealing surface formed as a surface of revolution on the flow control head and constituting an annular segment of a sperical surface. The seat and the sealing surface on the slide are relatively positioned to effect, upon initial mutual engagement, line contact medially located transversely in relation to the seat and in relation to the sealing surface, which line contact is expanded laterally in response to increasing force of differential fluid pressure on the slide. The sealing head has a transverse size materially smaller than the corresponding size of the valve chamber. Upon unseating of the annular sealing surface from the seat by fluid pressure, fluid flows through the chamber around the valve head to enter the slide through openings adjacent the head to flow through the slide and out through an outlet channel communicating with the chamber. Optionally, an annular kerf of generally cylindrical form is formed in the flow control head on the inlet side thereof to extend inwardly in adjacent axially overlapping relation to the sealing surface on the head on the radially inward side of the sealing surface to facilitate inward flexing of the portion of the head defining the annular sealing surface by the reaction on the sealing surface of the valve seat when the valve is closed.

The present invention relates to fluid flow-control valves generally, and in particular to check valves.

Check valves are used to limit the flow of fluid to one direction through a conduit. The pressure of the fluid in the forward direction opens the check valve, and the pressure of the fluid in the reverse direction closes the check valve to check the fluid flow. Valves of this type find many applications in both hydraulic and pneumatic systems.

One of the common types of check valves is the ball and seat valve. In check valves of this type, the fluid conduit is provided with a cylindrical enlarged chamber and a spherical ball is translatably disposed within the chamber. The conduit has an opening of smaller diameter than the chamber at one end of the chamber and on the axis of the chamber, and the opening forms a seat for the ball. Fluid flow through the conduit entering the chamber through the opening forces the ball from the seat, thus permitting fluid flow about the periphery of the ball, but when the flow is in the reverse direction the ball is forced against the seat checking the flow.

Conventional check valves have certain limitations, as may be observed in reference to the ball and seat valve. Even in the forward flow direction, such check valves tend to restrict the flow of fluid. The fluid flow in the forward direction is diverted from its path to flow through the annular gap between the periphery of the ball and the surface of the chamber, thus creating a resistance to flow. It is one of the objects of the present invention to provide a check valve which inherently has a reduced resistance to flow in the forward direction over that of prior check valves.

Most ball and seat check valves also fail to provide a complete check to flow in the reverse direction under low pressure conditions. When subjected to reverse flow, the pressure of the fluid forces the ball into contact with the seat, and if the force of the reverse flow is less than required to provide a complete seal between the ball and the seat, the valve will permit a limited flow in the reverse direction. It is a further object of the present invention to provide a check valve which will check reverse flow under lower pressures than the check valves presently available.

A ball and seat chcek valve may be constructed which will check reverse flows under low pressure conditions by providing the valve with a soft ball, such as a ball of rubber. Such check valves, however, have a very short life, since the ball will deform or deteriorate, thus causing the valve to fail to check reverse flow. Check valves have also been made for low pressure by carefully grinding a metal seat to mate with a metal sphere. Such check valves are expensive, and also fail to seal if a foreign particle lodges on the seat or the seat becomes slightly worn. It is an object of the present invention to provide a low cost check valve capable of checking reverse flow of low pressure, tending to seal in spit of the presence of small particles and exhibiting a long life.

Long life is achieved in conventional ball and seat check valves by constructing both the ball and the seat of relatively hard metal, such as steel, and employing materials of about the same hardness for both the ball and the seat. When such check valves are used with high pressures, the ball pounds against the seat each time the direction of flow is changed from the forward direction to the reverse direction, and the softer of the ball and seat becomes deformed under repeated pounding. It is an object of the present invention to provide a check valve which is capable of use at relatively high pressures for long periods of time. It is also an object of the present invention to provide another novel check valve which will seal at low pressures and which has a long life even when used with high pressures.

These and other objects and advantages of the present invention will be more fully appreciated from a consideration of the following specification, particularly when viewed in the light of the drawings, in which:

FIGURE 1 is a transverse sectional view of a check valve constructed in accordance with present invention;

FIGURE 2 is a sectional view taken along the line 2—2 of FIGURE 1;

FIGURE 3 is an enlarged sectional view of the translatable check member of the check valve of FIGURES 1 and 2;

FIGURE 4 is an enlarged front elevational view of the translatable check member of the check valve ot FIGURES 1 through 3;

FIGURE 5 is an enlarged sectional view taken along the transverse axis of a modified translatable check member suitable for use in the valve of FIGURES 1 through 4; and FIGURE 6 is an enlarged front elevational view of the translatable check member of FIGURE 5.

FIGURES 1 and 2 illustrate a check valve with a valve block or body 10 constructed of a relatively hard durable material, such as steel, brass or the like. The valve body is provided with a chamber 12 therein, and the chamber 12 has a central axis of elongation. The chamber 12 is formed by a surface 14 of the body which is disposed parallel to the axis of elongation, and in a preferred construction, the surface 14 is cylindrical. In order to make the valve readily repairable, the valve body is constructed in two parts 16 and 18. The part 16 has a recess 20 which extends therein from one end 22, and the innermost portion of the recess forms the surface 14 of the chamber 12. The surface of the portion 24 of the recess adjacent to the end 22 is threaded, and this interiorly threaded portion engages an exteriorly threaded cylindrical end 26 of the part 18 to secure the two parts 16 and 18 together and form the valve body or block 10. The part 18 is provided with an O-ring groove 28 which extends coaxially about the axis of the part 18 adjacent to the threaded end 26, and an O-ring 30 is disposed in the groove 28. The O-ring 30 engages a short cylindrical surface 32 between the end 22 of the part 16 and the interiorly threaded portion 24 of the part 16 to assure a fluid tight seal between the two parts 16 and 18 when tightened together.

A first channel 34 extends into the part 16 along the central axis of the body from an end 36 opposite the end 22, and the first channel communicates with the chamber 12 by means of a first opening 38 located at the end of the recess 20 opposite the end 22 of the part 16 on the central axis of the chamber 12. The first channel 34 tapers inwardly from the opening 38 to form a conical seat 40, and the outer periphery of the conical seat 40 is coincident with the opening 38 in the valve illustrated, but need not be coincident. The inner periphery 42 of the seat 40 communicates with a portion 44 of the channel 34 which has a cross-sectional area measured normal to the axis of the channel 34 no less than the inner periphery 42 of the seat 40, and thus the inner periphery 42 determines the flow capacity of the check valve. The portion 44 of the first channel 34 communicates with a cylindrical end region 46 of the channel disposed at the end 36 of the part 16 and of greater diameter than the portion 44, and the region 46 of the channel 34 is adapted to receive and be sealed to a conduit with an inner diameter no less than the diameter of the upper periphery 42 of the conical seat 40.

The valve body 10 also has a second channel 48 which is disposed on the central axis of the body 10 and which passes through the second part 18 of the body. The second channel 48 also has a region 50 extending into the part 18 from an end 52 remote from the threaded end 26 of the part 18 which is adapted to receive and be sealed to a conduit having a passage with a diameter no less than and preferably approximately equal to the diameter of the inner periphery 42 of the conical seat 40. The region 50 of the second channel communicates with the chamber 12 through a portion 53 of the second channel of reduced diameter.

A slide or flow blocking member 54, illustrated in detail in FIGURES 3 and 4, is disposed within the chamber 12, and the member 54 has a guide portion 56 and a head portion 58 integral therewith and confronting the seat 40 of the part 16 of the valve body 10. The guide portion 56 has a cylindrical outer surface 60 which slidably abuts the cylindrical surface 14 of the chamber 12 and restricts the member 54 to translation along the axis of the chamber 12. The guide portion 56 also has a recess 62 extending therein from the end opposite the head portion 58 along the central axis of the surface 60, and the recess 62 terminates adjacent to the head portion 58 forming a flat disc portion 64 which carries the head portion 58.

The head portion 58 protrudes from the disc portion 64 to confront the seat 40 and to engage the seat 40 when the member is translated in the chamber 12 to its stop position adjacent to the end 36 of the part 16 of the body 10. The head portion 58 has a spherical segment 66 extending from the disc portion 64 with a radius of curvature approximately equal to the radius of the outer periphery 38 of the seat 40 and centered on the central axis of the cylindrical surface 60. The part spherical portion has a center located on the surface of the disc portion 64 remote from the recess 62, and hence is essentially half a sphere. As a result the outer diameter 68 of the spherical segment 66 is approximately equal to the diameter of the outer periphery of the seat 40, and no portion of the spherical segment 66 will engage the relatively sharp edge between the opening 38 and the end wall of the chamber, designated 70. The radius of curvature of the spherical segment 66 may be greater than the radius of the outer periphery of the seat 40, but the maximum diameter 68 of the segment can not exceed the diameter of the outer periphery of the seat 40.

When the member 54 is translated into abutment with the seat 40, at the instant of contact the conical seat 40 engages the spherical segment 66 tangentially, thus forming a circular line contact. As pressure is applied between the member 54 and the seat 40, both tend to deform, thus increasing the area of contact between the two and increasing the length of any leakage paths to provide a tighter seal. If the check valve is to seal at low pressures, it is desirable to obtain substantial deformation to achieve a seal with a reverse flow at the low pressure limit, since deformation will reduce the requirement of precise fit between the member 54 and the seat 40, and will also reduce the probability of leakage as a result of a foreign particle lodging between the member 54 and the seat 40.

In order to provide deformation of the member 54 in response to relatively small forces generated by a reverse low pressure flow, the member 54 is constructed of a soft material, that is a material which will deform readily, much more readily than the body 10. In addition, the material of the member must return to its original shape after forces are removed. Plastics have been found particularly suitable for the member 54, since they can be formulated to produce a soft material, and some plastics also may be formulated to produce a relatively resilient material, but the two properties are generally incompatible. In addition, plastics are readily fabricated, as by molding or machining for example. In addition to having the properties of desired softness and elasticity, the material of the member 54 should exhibit minimum hysteresis effects due to repeated deformation, and should not be attacked by the fluids which are to be applied to the check valve.

If the valve is only to be used for checking low pressure fluids, a relatively soft material may be used for the member 54. However, if the valve is to be used to check fluids having a wide range of pressures, it is necessary to use a resilient material in order to prevent deformation of the member exceeding the elastic limit of the material of the member 54 under high pressures and to provide an adequate life. The inventor has found that a particularly suitable material for the check member 54 is thermosetting polyformaldehyde, or polyoxymethylene plastic, such as that sold by E. I. du Pont de Nemours & Co. under the tradename Delrin. While the member may be made of metal, it may be made at a lesser cost of plastic, and may be molded rather than machined. When the member 54 is molded, it is desirable to provide a recess 72 extending into the head portion 58 from the disc portion 64 in order to reduce mold shrinkage. In addition, the recess 72 provides relatively thin walls for the head portion 58 and increases the ability of the head portion 58 to deform on abutment with the conical seat 40. Also, the head 58 is provided with a flat surface 74 disposed normal to the central axis of the cylindrical surface 60 in order to further reduce the amount of material in the head portion 58 and increase the flexibility thereof. The outer diameter of the circle formed by the flat portion 74, is no greater than the inner diameter 42 of the conical seat 40. With reference to FIG. 3, the number 75 is used to denote the sealing surface formed on the head 58 as a surface of revolution confronting the seat 40 and being convex in relation to the seat 40, as viewed in radial section, by virtue of the previously described curvature of the head segment 66.

The conical seat 40 is disposed at an acute angle to the central axis of the valve body 10, and the inventor has found that this angle greatly affects the ability of the check valve to seal at low pressures. When the check valve is used in a pneumatic system, it is often desirable for the check valve to provide a complete seal at pressures of the order of ten pounds per square inch. The inventor has found that the smaller the angle of the conical seat to the axis of the valve body, the greater will be the distortion of the head 58 on the member 54, and the lower the pressure that can be achieved with a given construction. The smaller the angle between the conical seat 40 and the axis of the body 10, however, the shorter the life of the valve. The inventor has found that plastic materials may be utilized with a valve seat 40 having an angle relative to the axis of the body 10 between twenty degrees and fifty degrees to seal at low pressures, of the order of ten pounds per square inch, the larger angles being utilized with soft materials. Soft materials, however, sacrifice life, since repeated deformation of the materials causes a permanent deformation of the material. A hard plastic material, such as Delrin, which under compression exhibits a two percent strain to a stress of eleven thousand pounds per square inch, will provide an effective seal with a conical seat 40 disposed at an angle to the axis of the body 10 between twenty and forty degrees for perssures less than two hundred pounds per square inch even for small valves, i.e., valves of one fourth inch and the like, and the inventor has found that the most suitable angle of the conical seat 40 relative to the axis of the body 10 for Delrin in such a valve in order to achieve seals under pneumatic pressures of approximately two hundred pounds per square inch is thirty-seven degrees.

As illustrated in the figures, a flow path through the valve is provided by a plurality of slots 76 which extend through the disc portion 64 and a portion of the guide 56. As illustrated, three slots 76 are provided leaving supporting ribs 78 between the slots to support the head 58 on the guide portion 56 of the member 54. Each of the slots 76 terminates in a flat plane 80 disposed parallel to the central axis of the cylindrical surface 60 and intersecting the outer diameter 68 of the spherical segment 66. The slots 76 extend approximately half way through the guide 56 to provide a passage for fluid. Each of the slots 76 provides an effective opening for the passage of fluid, and the combined effective opening of all slots 76 is at least as great as the cross sectional area of the inner diameter 42 of the conical seat 40 so that the member 54 will not form a restriction to the flow of fluid in the forward direction.

The end of the part 18 opposite the end 52 forms a shoulder 82 confronting the chamber 12, and a helical spring 84 has one end disposed in abutment with the shoulder 82 and the other end disposed in abutment with the confronting surface of the disc portion 64 of the member 54. The helical spring 84 urges the member 54 into engagement with the conical seat 40, and flow of fluid in the forward direction must overcome the force of the spring on the member 54 to open the check valve. The outer diameter of the helical spring 84 is slightly less than the inner diameter of the guide portion 56 of the member 54, and hence the helical spring cooperates with the cylindrical wall 14 of the body 10 in maintaining the member 54 in alignment with the axis of the body 10. In addition, the guide portion 56 protects the spring against damage, and prevents the spring from being displaced to interfere with the flow of liquid through the check valve.

FIGURES 5 and 6 illustrate a modified form of sealing member which may be used in place of the sealing member 54 of the valve illustrated in FIGURES 1 through 4, and the sealing member in FIGURES 5 and 6 has been designated by the reference numeral 54A. Portions of the sealing member 54A which are identical to the sealing member 54 are shown with the same reference numerals employed in FIGURES 1 through 4. The sealing member 54A differs from the sealing member 54 in that it employs a circular groove 86 which extends into the part spherical segment 66 coaxially with the central axis of the cylindrical surface 60. The groove 86 forms a circular lip 88 which extends from the outer diameter 68 of the spherical segment 66, and it is the lip 88 which engages the conical seat 40 of the valve body 10. The groove 86 provides additional compliance for the lip 88, thus permitting the valve to seal at lower pressures. In the construction of the sealing member 54A shown in FIGURES 5 and 6, the groove 86 enters the spherical segment 66 at a diameter approximately equal to the inner diameter 42 of the conical seat 40. The diameter of the groove may be made smaller than the outer diameter 68 of the spherical segment 66 for sealing at lower pressures, but the valve will have a reduced life.

In one particular construction of a valve according to the present invention employing the sealing member 54A, the diameter of the portion 44 of the first channel 34 is 5/16 inch, the outer diameter of the conical seat 40 is 0.436 inch, the conical seat 40 is disposed at an angle of 37° to the axis of the body 10, the diameter of the cylindrical surface 14 of the recess 12 is 0.657 inch, the outer diameter of the surface 60 of the member 54A is 0.650, the inner diameter of the guide portion 56 of the member 54A is 0.560, the spherical segment 66 of the member 54A has a diameter of 0.436, the slot 86 has an outer diameter of approximately 0.350 and the depth of the slot 86 is approximately 0.075 inch, the axial length of the cavity 12 is approximately 0.463 inch, the axial length of the member 54A measured from the surface 74 to the remote end of the guide portion 56 is 0.480 inch. The sealing member 54A is constructed of Delrin. A valve constructed in this manner in an air system will seal at pressures of ten pounds per square inch and may be used at pressures up to about two hundred pounds per square inch. If the slot 86 is omitted, as in FIGURES 1 through 4, the valve may be utilized in oil systems at pressures from about 200 pounds per square inch to pressures of three thousand pounds per square inch and higher.

From the foregoing description, those skilled in the art will readily devise many constructions within the intended scope of this invention. Further, those skilled in the art will find many applications for the present invention beyond that here set forth. It is therefore intended that the scope of the present invention be not limited by the foregoing disclosure, but rather only by the appended claims.

I claim:

1. A check valve comprising, in combination, a slim valve body defining therein a valve chamber and defining an interior wall surface encircling said chamber, said valve body defining an inlet channel therein opening into one end of said chamber, a valve seat encircling the inner end of said inlet channel and being formed by a first annular surface of revolution of substantial transverse width on said valve body encircling the inner end of said channel and diverging in an inward direction to have the general shape of a truncated cone, a flow control slide disposed within said valve chamber and being slidably supported on said interior wall surface thereof for translation toward and away from said valve seat, a spring biasing said slide toward said seat, said slide having on the valve seat end thereof an integral head shaped externally in the form of a segment of a sphere and defining a sealing surface confronting said valve seat and being formed as a second annular surface of revolution of substantial transverse width shaped as an annular sector of a spherical surface, said first annular surface of revolution forming said seat having as viewed in radial section a shape that is relatively straight in relation to the curved shape of said sealing surface on said slide as similarly viewed; said sealing surface of revolution and said first annular surface of revolution being positioned relative to each other to contact each other, upon initial mutual engagement, along a line medially positioned transversely in relation to each of said surfaces of revolution; said slide being centrally open and opening axially away from said integral head thereon, said slide defining radial openings therein opening outwardly from within the slide into said chamber at a location along the slide adjacent to the inward side of said integral head on the slide, said integral head on the slide which defines said annular sealing surface having a transverse size materially less than the corresponding transverse size of said chamber to allow the passage of fluid through said chamber around said head to flow through said radial openings and through the centrally open slide upon displacement of said head from said seat by differential fluid pressure, said body defining an outlet channel opening into said chamber at a location spaced from said seat, and said head defining a recess extending thereinto from the outlet channel side thereof to facilitate flexing of said head under the forces of differential fluid pressure thereon.

2. A check valve comprising the combination of claim 1 in which said valve body is formed of metal and said slide including said integral head thereon is formed of a plastics material.

3. A check valve as defined in claim 1 in which said slide is formed of the plastics material polyoxymethylene.

4. A check valve as defined in claim 1 in which said slide is formed of the plastics material polyformaldehyde.

5. A check valve comprising, in combination, a valve body defining therein a valve chamber and defining an interior wall surface encircling said chamber, said valve body defining an inlet channel therein opening into one end of said chamber, a valve seat encircling the inner end of said inlet channel and being formed by a first annular surface of revolution of substantial transverse width on said valve body encircling the inner end of said channel and diverging in an inward direction to have the general shape of a truncated cone, a flow control slide disposed within said valve chamber and being slidably supported on said interior wall surface thereof for translation toward and away from said valve seat, said slide having a flow control head thereon confronting said valve seat and defining thereon an annular sealing surface formed as a second surface of revolution of substantial transverse width having as viewed in radial section a smoothly curved shape convex toward said valve seat, said first annular surface of revolution forming said seat having as viewed in radial section a shape that is relatively straight in relation to the curved shape of said sealing surface on said slide as similarly viewed; said sealing surface of revolution and said first annular surface of revolution being positioned relative to each other to contact each other, upon initial mutual engagement, along a line medially positioned transversely in relation to each of said surfaces of revolution; said slide being centrally open and opening axially away from said flow control head thereon, said slide defining openings thereinto form said chamber at a location along the slide adjacent to the inward side of said head on the slide, said flow control head on the slide having a transverse size materially less than the corresponding transverse size of said chamber to allow the passage of fluid through said chamber around said head to flow through said slide upon unseating of said head from said seat by differential fluid pressure, and said body defining an outlet channel communicating with said chamber at a location spaced from said seat on the slide side thereof.

6. A check valve as defined in claim 5 in which said valve seat is formed of metal and said flow control head is formed of a plastics material.

7. A check valve comprising, in combination, a valve body defining therein a valve chamber and defining an interior wall surface encircling said chamber, said valve body defining an inlet channel therein opening into one end of said chamber, a valve seat encircling the inner end of said inlet channel and being formed by a first annular surface of revolution of substantial transverse width on said valve body encircling the inner end of said channel and diverging in an inward direction to have the general shape of a truncated cone, a flow control slide disposed within said valve chamber and being slidably supported on said interior wall surface thereof for translation toward and away from said valve seat, said slide having a flow control head thereon confronting said valve seat and having the overall shape of a segment of a sphere, said head defining in the side thereof facing toward said seat an annular lip projecting axially toward said seat in confronting coaxial relation thereto to flex radially inward, said lip defining thereon an annular sealing surface formed as a second surface of revolution of substantial transverse width having as viewed in radial section a smoothly curved shape convex toward said valve seat, said first annular surface of revolution forming said seat having as viewed in radial section a shape that is relatively straight in relation to the curved shape of said sealing surface on said slide as similarly viewed; said sealing surface of revolution and said first annular surface of revolution being positioned relative to each other to contact each other, upon initial mutual engagement, along a line medially positioned transversely in relation to each of said surfaces of revolution; said slide being centrally open and opening axially away from said flow control head thereon, said slide defining openings thereinto form said chamber at a location along the slide adjacent to the inward side of said head on the slide, said flow control head on the slide having a transverse size materially less than the corresponding transverse size of said chamber to allow the passage of fluid through said chamber around said head to flow through said slide upon unseating of said head from said seat by differential fluid pressure, and said body defining an outlet channel communicating with said chamber at a location spaced from said seat on the slide side thereof.

8. A check valve as defined in claim 7 in which said valve seat is formed of metal and said flow control head is formed of a plastics material.

References Cited

UNITED STATES PATENTS

| | | | |
|---|---|---|---|
| 1,693,177 | 11/1928 | Hodgart et al. | 137—516.27 |
| 2,653,792 | 9/1953 | Sacchini | 137—540 XR |
| 2,755,816 | 7/1956 | Collins | 251—333 XR |
| 2,930,401 | 3/1960 | Cowan | 137—540 |
| 2,970,804 | 2/1961 | Busby et al. | 251—175 |
| 3,029,835 | 4/1962 | Biello et al. | 137—540 XR |
| 3,054,422 | 9/1962 | Napolitano | 137—516.27 XR |
| 3,189,046 | 6/1965 | Callahan et al. | 137—540 XR |
| 3,255,774 | 6/1966 | Gallagher et al. | 137—540 XR |
| 3,315,696 | 4/1967 | Hunter | 137—242 XR |

FOREIGN PATENTS 901,142  7/1962  Great Britain.

STANLEY N. GILREATH, Primary Examiner

W. H. SCHROEDER, Assistant Examiner

U.S. Cl. X.R.

137—516.27, 543.19; 251—333